United States Patent [19]

Curran

[11] Patent Number: 5,278,967
[45] Date of Patent: Jan. 11, 1994

[54] SYSTEM FOR PROVIDING GAPLESS DATA TRANSFER FROM PAGE-MODE DYNAMIC RANDOM ACCESS MEMORIES

[75] Inventor: Brian W. Curran, Saugerties, N.Y.

[73] Assignee: International Business Machines Corporation, Armonk, N.Y.

[21] Appl. No.: 576,252

[22] Filed: Aug. 31, 1990

[51] Int. Cl.5 .......................................... G06F 12/02
[52] U.S. Cl. .................................... 395/425; 365/230.05; 364/DIG. 1; 364/243; 364/246; 364/246.3
[58] Field of Search ................................ 395/400, 425; 365/230.03, 233, 233.5, 238.5; 364/200

[56] References Cited

U.S. PATENT DOCUMENTS

| | | | |
|---|---|---|---|
| 4,099,253 | 7/1978 | Dooley, Jr. ........................ | 395/425 |
| 4,667,313 | 5/1987 | Pinkham et al. ................... | 365/240 |
| 4,716,545 | 12/1987 | Whipple et al. ................... | 395/425 |
| 4,823,324 | 4/1989 | Taylor et al. ...................... | 365/230 |
| 4,845,664 | 7/1989 | Aichelmann, Jr. et al. ....... | 371/40.4 |
| 4,903,217 | 2/1990 | Gupta et al. ....................... | 395/425 |
| 4,992,979 | 2/1991 | Aichelman, Jr. et al. ......... | 395/425 |
| 5,034,917 | 7/1991 | Bland et al. ....................... | 364/900 |
| 5,121,354 | 6/1992 | Mandalia .......................... | 365/238.5 |
| 5,159,676 | 10/1992 | Wicklund et al. ................ | 395/425 |

FOREIGN PATENT DOCUMENTS

0198258 10/1986 European Pat. Off. .
0220535 6/1987 European Pat. Off. .

Primary Examiner—Rebecca L. Rudolph
Attorney, Agent, or Firm—Lynn L. Augspurger

[57] ABSTRACT

A programmable memory controller generates address and control signal information associated with a word of data which is desired to be transferred first from dynamic random access memory (DRAM) modules. The generated information specifically assists memory support circuitry interfacing with page mode DRAMs. This information is normally provided to the memory support circuitry just before selection of the staring word from a fetch line data buffer. Memory latency, gaps in data transfer, can be reduced when this information is available to the support circuitry as it drives column address and/or column address strobe (CAS) signals to the DRAMs.

14 Claims, 7 Drawing Sheets

SYSTEM FOR PROVIDING GAPLESS DATA TRANSFER FROM PAGE-MODE DYNAMIC RANDOM ACCESS MEMORIES

BACKGROUND OF THE INVENTION

1. Field of the Invention

This invention relates to data processing systems, and more specifically to improved mechanisms for controlling the access of data from page mode addressed dynamic random access modules (DRAMS). These DRAMs are memories organized into rows and columns for page mode access of the memories as sets, banks or modules.

2. Description of Prior Art

Figure 1:
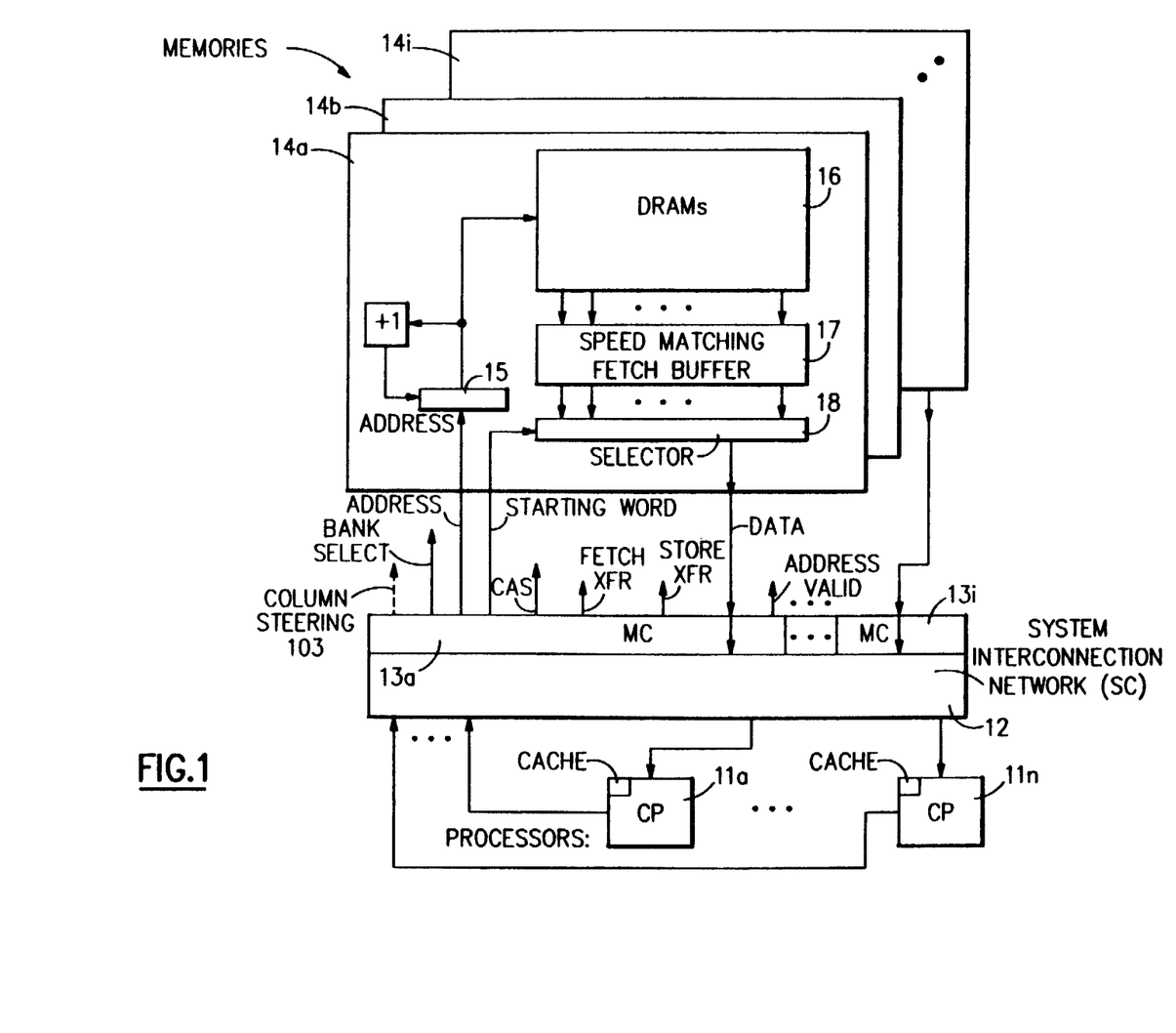
FIG. 1 illustrates a processing system by which DRAMs are accessed via page mode.

FIG. 1 except for dashed line 103 shows a prior art processing system whereby dynamic random access memories in each of the modules are accessed via page mode to obtain a line of data. The system includes one or more independent central processors (CP) 11a through 11n, a system interconnection network (SC) 12 containing one or more memory controllers (MC) 13a through 13i, and one or more memories 14a through 14i. Each memory contains an address latch with incrementer 15, one or more banks of DRAMs 16, a speed matching fetch data buffer 17, and a data transfer selector 18. The memory logic which interfaces directly with the DRAMs, i.e. everything within the memory 14 with the exception of the DRAMs 16, is termed the memory support circuitry.

A cache within each CP holds lines of data which it has most recently used. When a word of data required by a processor is not found in its cache the CP requests this data from the SC. The SC obtains the most recent copy of the line containing this word (whether it is in memory or in another processor's cache) and transfers it to the requesting CP. In the cycles which immediately follow the transfer of the requested word the SC transfers the remaining words which comprise the line.

DRAMs are accessed via page mode to obtain a line of data in prior art memory designs. Page mode is a mode by which a single row address and a plurality of column addresses access a plurality of data bits from each DRAM data I/0 (input/output). In such designs only a portion of a data line is accessed with each column address. The benefits of such designs have been well documented. When page mode is invoked to access a line of data less DRAMs are activated and therefore less power is consumed on a line access. Also page mode reduces the data I/0 requirements between the DRAMs and speed matching buffer. The reduced I/0 requirements allow for improved memory integration (memory designs with fewer cards) or increased data line sizes.

Unfortunately page mode designs have disadvantages also. One, the memory cycle time is increased because each memory access requires multiple column addresses and multiple column address strobe pulses. Also memory line data is loaded piecemeal into the speed matching fetch buffer. Generally the word required by the processor is the first to be loaded into the fetch buffer. However, the next sequential words within the line are not always available to be transferred in subsequent cycles. The subject invention addresses this problem.

SUMMARY OF THE INVENTION

The subject invention provides for sequential, gapless transfer of fetch data words from memory to the requesting processor with minimum latency. Sequential transfer of words within the line is advantageous for systems with processors executing sequential instructions. Gapless transfer of fetch data is advantageous in multiprocessing systems since it results in more efficient utilization of the system interconnection logic (gaps in the data transfer waste system interconnect resources.) Also gapless transfers are advantageous in systems with pipelined vector processors or in vector processing systems with chain operations.

A digital processing system is disclosed that includes a processor and at least one memory including memory support circuitry and memory modules which can be accessed in page mode to obtain a line of data. The system includes an interconnection network including a memory controller providing a control signal indicating a starting word of the requested line to be transferred first. The memory support circuitry is responsive to the control signal for providing the column address corresponding to said starting word of the line and the successive column addresses for successive words.

DETAILED DESCRIPTION OF THE PREFERRED EMBODIMENTS

Systems which utilize page-mode DRAMs and access memory data in line sizes that are greater than a transfer word can apply this invention. Referring to FIG. 1 this invention incorporates a memory controller (MC) which sequences the row address, column address (or addresses), row address strobe RAS, column address strobe CAS, fetch transfer and store transfer signals. In addition to sequencing the memory read and write operations the memory controller (MC) of this invention communicates starting transfer word information or column steering indicated by dashed line 103 on or before transmission of the first column address.

The memory support circuitry in the memory 14 of the subject invention incorporates logic to receive this starting word information and drive distinct low order address bits to each DRAM word set. A DRAM set holds two or more words of each line. For example in a two page cycle memory design where 16 words comprise a line, the support circuitry drives eight distinct low order address bits. One low order address bit is driven to the DRAM set containing words 0 and 8, another drives the DRAM set containing words 1 and 9, etc.

Figure 2:
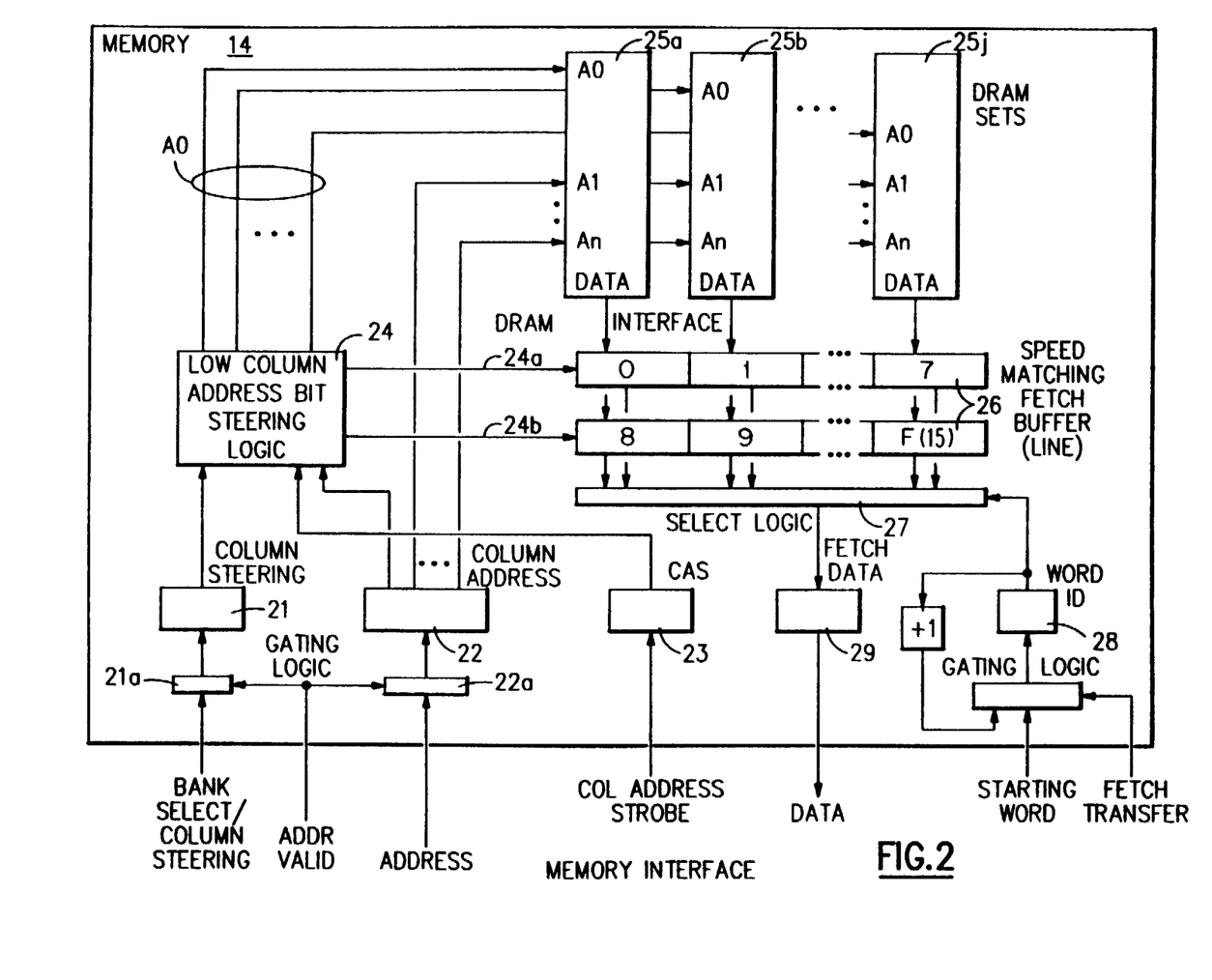
FIG. 2 illustrates the memory in subject invention wherein column address bits are inverted to the appropriate DRAMs to demonstrate an embodiment of the invention by way of example.

The subject invention memory hardware is illustrated in FIG. 2. The column steering latch 21, column address latch 22, and column address strobe latch 23 are staging latches which receive and retain interface signals driven from the memory controller 13a through 13i of FIG. 1 (also see FIG. 5). Gating logic of gates 21a and 22a (as shown for the column steering and column address latches) may be incorporated into the design to receive a valid signal which activates in those cycles when interface data is valid. The column steering latch 21 is loaded with the starting word information in parallel with the loading of the column address latch 22. One or more of the low order column address bits and the column steering latch 21 are received by the steering logic 24 in FIG. 2.

The low order column address logic 24 of FIG. 2 of the memory support circuitry can be formulated explicitly. The memory controller drives a column address CA to the support circuitry which consists of high order column address bits HA and low order column address bits LA. In two page-cycle memory designs LA is a single bit; in four page-cycle memory designs LA is two bits, etc. The memory controller also drives a starting word SW to the support circuitry. The support circuitry generates the first CAS cycle low order column address bits to DRAM set j, LA(j), according to the equation, $$LA(j) = LA + (SW \geq j),$$

where (SW>j) is 1 when the inequality is true and 0 otherwise. Any overflow resulting from the binary addition is ignored. Subsequent low order column address bits for the second, third, and fourth CAS cycles are determined as follows, $$LA2(j) = LA(j) + 1$$

$$LA3(j) = LA2(j)1$$

$$LA4(j) = LA3(j) + 1.$$

Again any overflow resulting from the binary addition is ignored. In the case where LA is a single bit the equation reduces to $$LA(j) = LA \text{ xor}(SW>j),$$

and the low order column address bits for the second CAS cycle are simply, $$LA2(j) = LA(j).$$

We can illustrate processor address correlation to data stored in the DRAMs in accordance with FIGS. 1 and 2. The processors 11a . . 11n generate a word address which points to a word (4-byte) storage location. The system interconnection network 12 receives this work address and provide a line address, designating 64 bytes of storage, to one of the memories 14a, . . . 14i. This line address provided to the memory includes the work specified by the processor and fifteen other words immediately preceding or following the processor-specified word. The line address is divided into a row address (bits A0 to An) and a column address (bits A1 to An). The exact method of division is not important to the invention. The longest order column address bit A0 is used to select a low or high word within the line. The DRAMs within the memories 14a, . . . 14i are grouped into sets 25a, 25b, . . . 25j; all DRAMs are configured as 1M by 1. DRAM set 25a consists of 32 DRAMs, each DRAM contributing one bit of work 0 and one bit of work 8 of the line. Word 0 is always stored at an even column address and word 1 is always stored at an odd column address. Words 0 and 8 can be accessed in a page-mode DRAM by simply toggling column address bit A0. Similarly, DRAM set 25b consists of 32 DRAMs, each DRAM contributing one bit of word 1 and one bit of work 9 of the line; DRAM set 25c consists of 32 DRAMs, each DRAM contributing one bit of word 2 and one bit of word A; and so forth.

Figure 3:
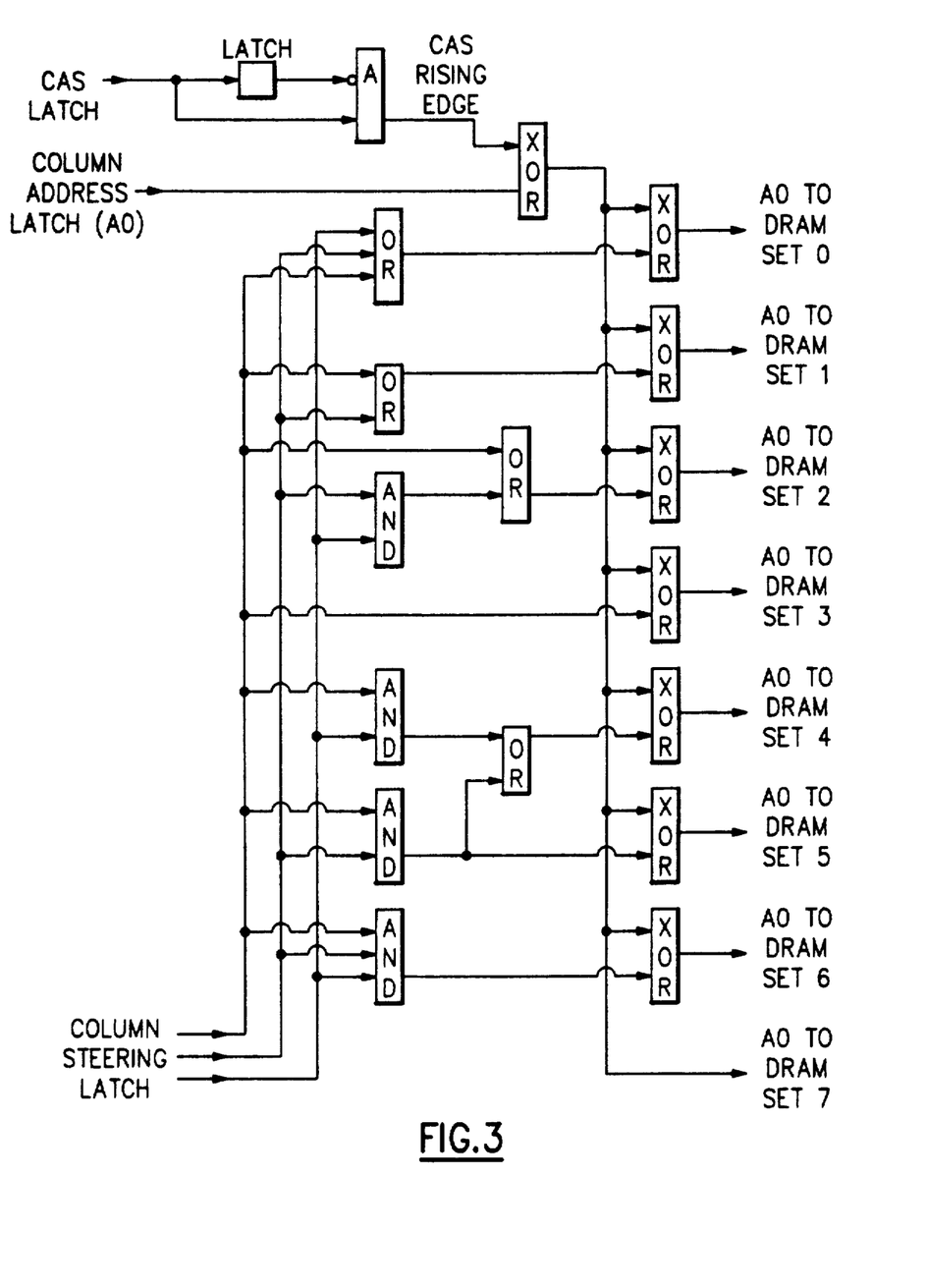
FIG. 3 is a logic diagram of the steering logic of FIG. 2.

FIG. 3 is a logic diagram of the steering logic following the above.

Consider a memory with 8 DRAM sets whereby a line of 16 words are written or read via two column addresses and two CAS pulses. If a processor requests word 6 of line 0 the memory controller signals the memory support circuitry to access row address 0, column address 0 with starting word 6.

The above support logic generates ONEs on the low order column address bits to DRAM sets 0 through 5 and ZEROs on the low order column address bits to DRAM sets 6 and 7. When the data is loaded in the fetch buffer it is loaded into word positions 6, 7, 8 through D. In the second CAS cycle all low order column address bits are switched and the data is loaded into word positions E,F and 0 through 5. Thus, the subject invention just described provides a windowing effect during accessing of data. In systems whereby processors execute sequential instructions this invention is advantageous since it guarantees that the next sequential words within the data line can be transferred immediately after transfer of the starting word.

This steering logic drives multiple copies of each low order column address bit to the DRAM sets 25a through 25j. The appropriate low order column bits A0 are toggled to read the appropriate data from each DRAM set. Also the steering logic 24 drives gating information to the speed matching fetch buffer 26 via leads 24a and 24b. This gating information is used to steer the DRAM data into the appropriate section of the buffer. In the example shown in FIG. 2 the data from each DRAM set is loaded into either the high word or low word section of the buffer. The word identifier latch 28 is initialized with the starting word data on the memory interface. The word identifier latch controls the select logic 27 to select the first word to be loaded into the fetch data latch 29. This fetch data latch drives the data interface to the system interconnect logic 12 in FIG. 1 which forwards the data to the requesting processor. In the cycles which follow the word identifier latch 28 is incremented so sequential words are latched into the fetch data latch 29 and transferred across the interface. Data transfers end when the fetch transfer interface line from controller 13 switches from active to inactive.

In the preferred embodiment of the subject invention the column steering information is multiplexed with the bank select information on the memory controller to memory interface (see FIG. 1). This multiplexed bus contains bank select information when the row address is active on the interface and the column steering information when the column address is active.

Figure 4:
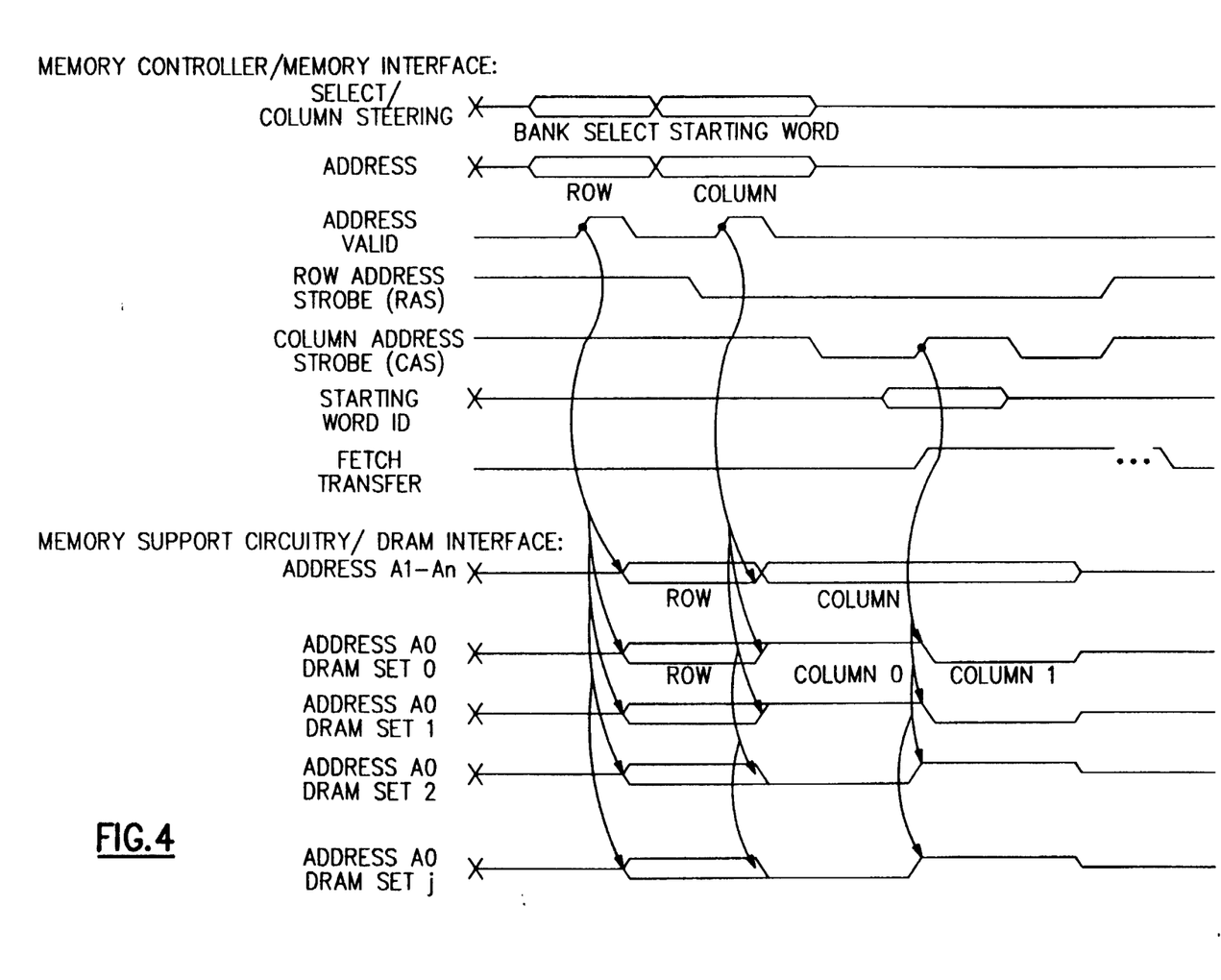
FIG. 4 illustrates the preferred embodiment timing diagrams of the memory controller/memory interface and the memory support/DRAM interface.

The preferred embodiment timing diagrams are shown in FIG. 4. The memory controller 13 drives the bank select information and row address onto the interface and signals the memory support circuitry that these lines are valid via an address valid pulse. The bank select/column steering lines are later switched to the column steering information simultaneously with the switching of the row address to the column address. Again an address valid pulse signals the memory support circuitry that these lines are valid. The memory controller also generates and drives the row address strobe and column address strobe pulses to the memory support circuitry. The support circuitry latches these timing signals and redrives and steers the RAS and CAS signals to the appropriate DRAMs. Sometime later in the memory access the starting word information is sent to the memory support circuitry with a fetch transfer timing signal. This is a signal for the memory support circuitry to begin transferring data from the fetch buffer 26 back to the system interconnection logic 12.

The lower portion of FIG. 4 illustrates the timing of the memory support/DRAM interface when for example the starting word is two. The memory support circuitry drives the same row address to all DRAMs on reception of the first address valid pulse from the memory controller. On reception of the second address valid pulse the support circuitry drives the same high order column address bits (A1 to An in this example) to all the DRAM sets. Different low order column address bits (A0 in this example) are driven to the DRAM sets. The column address bits A0 driven to DRAM sets 0 and 1 are ONE and the column address bits A0 driven to the remaining DRAM sets are ZERO. On detection of the active to inactive transition of the column address strobe at 24 of FIG. 2 all low order column address bits A0 are inverted.

It will be noted that in the invention described with the timing of FIG. 4, the column and steering data and the starting word id (identification) are equivalent. The column steering data is used during the DRAM access to control the column addresses. The staring work identification is sued to initialize the transfer of data from the fetch buffer back to the system interconnection network.

In some memory designs the data I/0 of two or more DRAM sets are connected to each other and the CAS signal to these DRAM sets are utilized as additional column address bits. In such designs the subject invention incorporates CAS steering logic in the support circuitry to activate CAS to the appropriate DRAM set. The above equations which define the low order column address bits are still valid. But now one or more of these address bits are decoded to activate CAS to the appropriate DRAM set. Note that CAS is activated to only one of the DRAM sets whose data I/0 are dotted together.

Figure 5:
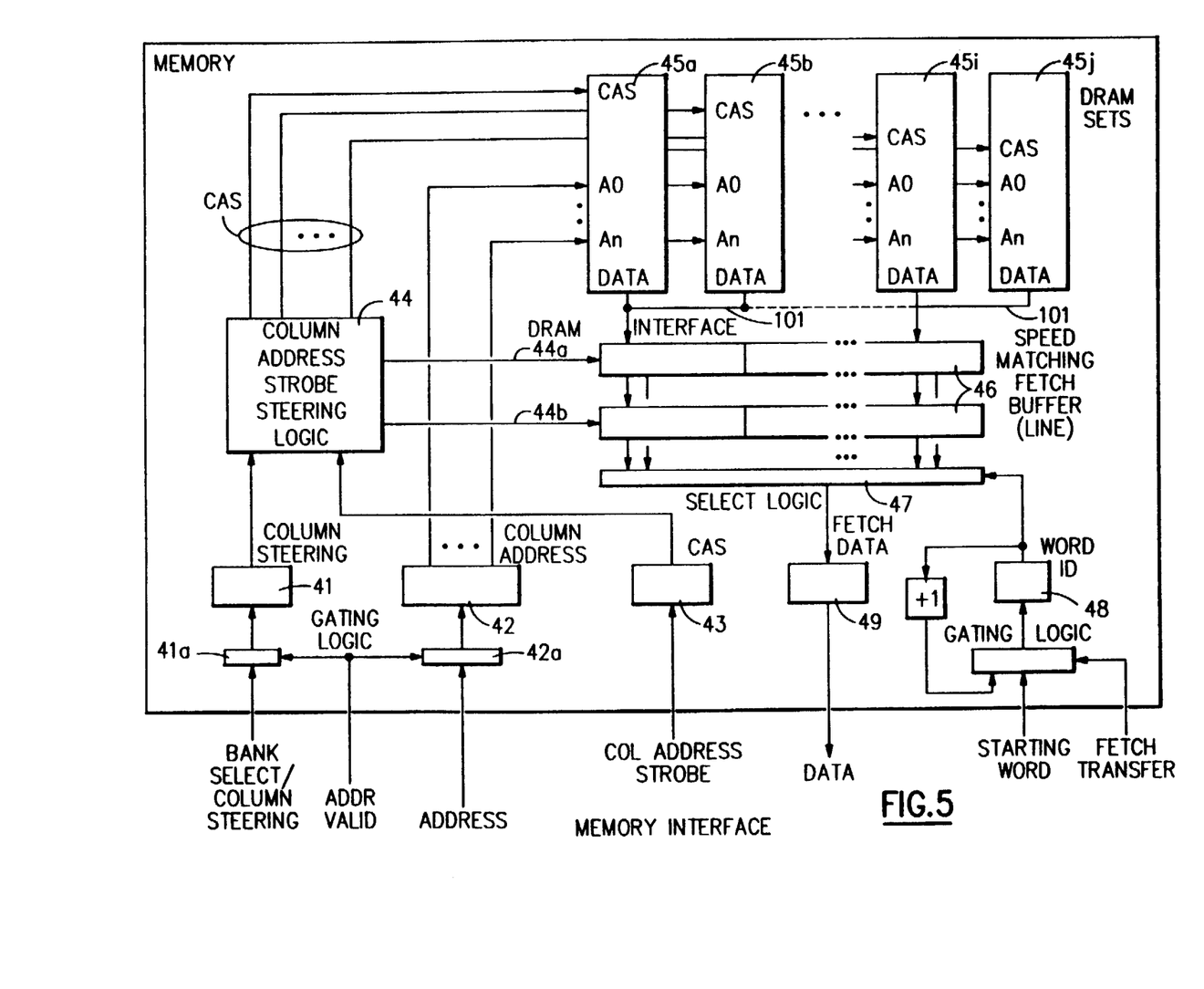
FIG. 5 illustrates the memory of subject invention by which column address strobe signals are steered to the appropriate DRAMs.

The subject invention memory hardware which steers the column address strobe signals to the appropriate DRAMs is illustrated in FIG. 5. The column steering latch 41, column address latch 42, and column address strobe latch 43 are staging latches which receive and retain interface signals driven from the memory controller 13a-13i. Gating logic 41a and 42a (as shown for the column steering and column address latches) may be incorporated into the design to receive a valid signal which activates in cycles when interface data is valid. The column steering latch 41 is loaded with the starting word information in parallel with the loading of the column address latch 42. The column address strobe latch 43 feeds the column address strobe steering logic 44 which activates the appropriate column address strobe signals to the DRAM sets 45a through 45j. In this design the DRAM data pins are connected to each other as shown by lead 101. The steering logic ensures that at any given time only one of the dotted DRAM sets is selected to drive data back to the speed matching fetch buffer 46. Also the steering logic 44 drives gating information to the speed matching fetch buffer 46 via leads 44a and 44b. This gating information is used to steer the DRAM data into the appropriate section of the buffer. In the example shown in FIG. 5 the data from each DRAM set is loaded into either the high word or low word section of the buffer. The word identifier latch 48 is initialized with the starting word data on the memory interface. The word identifier latch controls the select logic 47 to select the first word to be loaded into the fetch data latch 49. This fetch data latch drives the data interface to the system interconnect logic which forwards the data to the requesting processor. In the cycles which follow, the word identifier latch 48 is incremented so sequential words are latched into the fetch data latch 49 and transferred across the interface. Data transfers end when the fetch transfer interface line switches from active to inactive.

Also the preferred embodiment incorporates programmable circuitry in the memory controller to control the timing of the interface signals. Such programmability allows flexibility in the activation and deactivation of RAS pulse, the switching of the row address to the column address (also switching of bank select to starting word), the activation and deactivation of the CAS pulses, and the number of CAS cycles.

Figure 6:
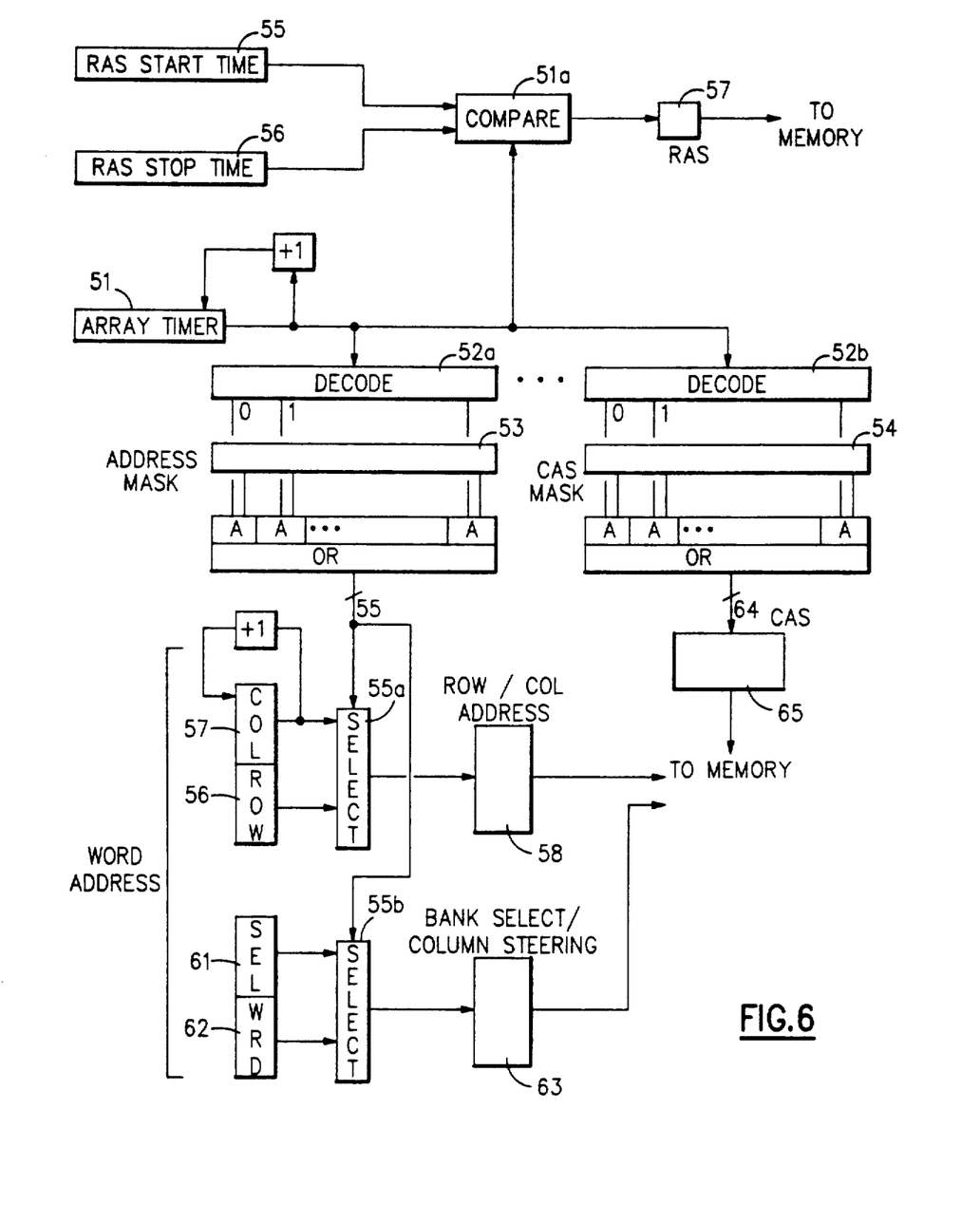
FIG. 6 illustrates the programmable address, row address strobe and column address strobe logic used in the preferred embodiment of the subject invention.

The programmable address timing, row address strobe, column address strobe generation logic of the preferred embodiment of the subject invention is illustrated in FIG. 6. An array timer 51 is initialized to ONE and incremented each cycle to sequence the memory controller 13 to memory support logic interface timings. The array timer 51 is compared with a programmable ras start time latch 55 and programmable ras stop time latch 56 at comparator 51a. When the array timer 51 falls between these two programmable times the RAS latch 57 is activated. This latch directly drives the RAS interface signal to the memory support circuitry. The array timer 51 is also decoded by decoders 52a and 52b whose outputs are compared with a programmable address mask 53 and programmable CAS mask 54. If the address mask register 53 contains a ONE in the bit position decoded by decoder 52a then signal 55 is activated. This signal selects the row portion 56 or column portion 57 from the system word address. This row or column portion is gated into the address latch 58 which directly drives the address interface bus to the memory support circuitry. The signal 55 also selects the bank select portion 61 or starting word portion 62 of the system word address. These selected bits are gated into the bank select/column steering latch 63 which directly drives the interface to the memory support circuitry. If the CAS mask register 54 contains a ONE in the bit position decoded by decoder 52b then signal 64 is activated. This signal is staged by the CAS latch 65 which directly drives interface to the memory support circuitry.

In spite of the subject invention windowing effect just described some memory designs may not always load the speed matching fetch buffer with enough consecutive words to provide a contiguous transfer of data to the requestor. This may be due to the number of DRAM sets, i.e. the number of distinct low order column address bits, the memory design supports. In such designs the number of consecutive transfer words loaded into the speed matching fetch buffer is a function of the starting transfer word. For example a memory design may only support the initial loading of words 0 through 7, 4 through 11, 8 through 15, etc. into the speed matching buffer. In such a design 5, 6, 7 or 8 consecutive words will be immediately available for transfer to the requestor. If the CAS cycle is greater than five transfer cycles then gaps will sometimes occur in the transfer unless the transfer of the starting word is delayed. Thus, the memory controller of the preferred embodiment of the subject invention incorporates multiple programmable latency registers whereby the appropriate latency or delay is selected for the starting transfer word. In this way accessed data can always be transferred to the requesting processor with minimum latency and without gaps.

Figure 7:
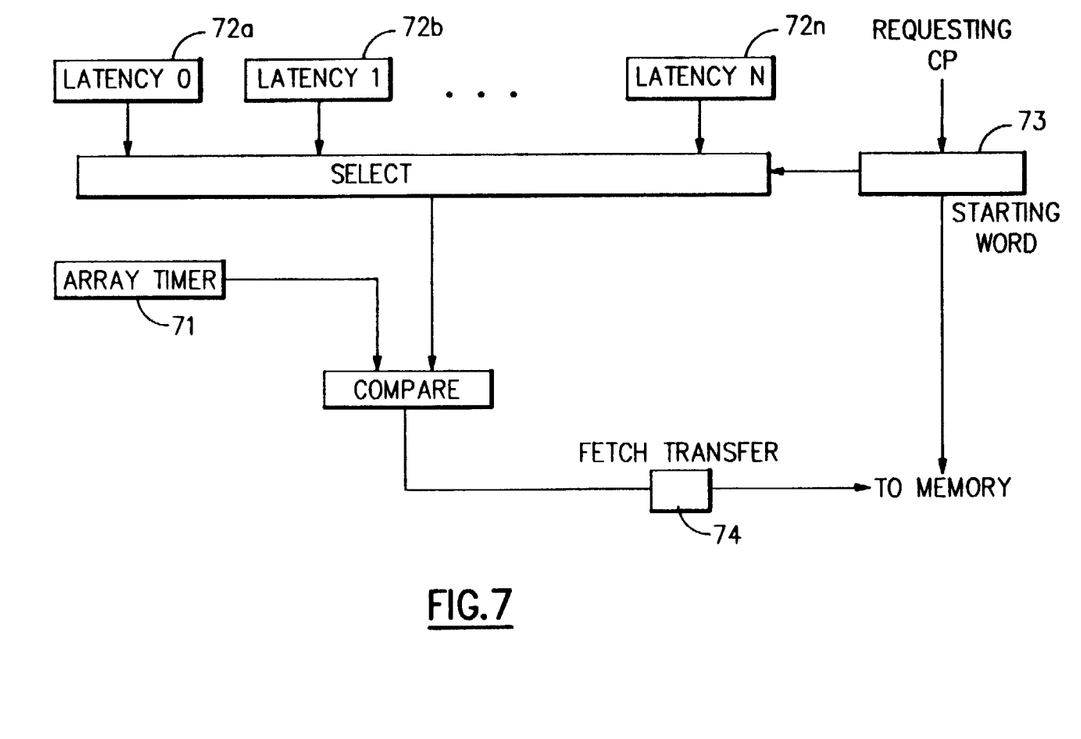
FIG. 7 illustrates the multiple programmable latency circuitry which can be used with the subject invention to eliminate any gaps in the data transfer from memory to the requesting processor.

FIG. 7 illustrates the multiple programmable latency function of the memory controller which can be used with the subject invention to guarantee that gaps never occur during the transfer of fetch data from memory to the system interconnection network. The array timer 71 shown in the diagram is the same array timer shown in FIG. 6. The starting word required by the requesting processor is latched in the starting word latch 73. The starting word (or a portion of the starting word) selects the appropriate programmable latency latch 72a through 72n. This selected latency is compared with the array timer and upon equality causes the fetch transfer latch 74 to be set. The fetch transfer latch 74 and starting word latch 73 directly drive the interface to the memory support circuitry.

This invention provides for a versatile memory controller/memory design which can be programmed to obtain sequential, gapless transfers of data from memories operating in page mode to a requestor over varying system cycle times. This invention allows a single memory design (with fixed CAS cycle time) to be used in many different systems. Changes in system cycle time can be easily accommodated with the subject invention.

This invention provides for a versatile memory controller/memory design which can be programmed to obtain sequential, gapless transfers of data from memories operating in static column mode, nibble mode or any other DRAM mode in which multiple data bits are accessed from each DRAM data I/O.

While this invention has been particularly described and illustrated with reference to embodiments thereof, it will be understood by those skilled in the art that changes in the above description or illustrations may be made with respect to form or detail without departing from the spirit or scope of the invention.

I claim:

1. A digital processing system comprising:
a digital processor;
a memory organized in rows and columns and including memory support circuitry and a plurality of memory modules;
an interconnection network including a memory controller coupled between said processor and said memory for sequencing the memory operations, said memory controller generating a first control signal indicating a selected word of a line of data; and
said memory support circuitry including means responsive to said first control signal for concurrently generating a unique column address for each of said plurality of memory modules and for providing said unique column addressed to each of said plurality of memory modules, said unique column addresses being a function of said first control signal and specifying the starting word and successive column addresses associated with successive words of the line of data in memory;
said memory controller including means for providing a Column Address Strobe (CAS) signal, said memory support circuitry further including means for changing said unique column addresses provided to each of said plurality of memory modules in response to a transition of said CAS signal.

2. The digital processing system as claimed in claim 1 wherein said memory controller incorporates programmable means to control the access time of said memory.

3. The digital processing system as claimed in claim 1 wherein said memory support circuitry includes a multiple word buffer, said multiple work buffer storing words from said plurality of memory modules, including said selected word, in response to said Column Address Strobe (CAS) signal.

4. The processing system of claim 3 wherein said memory support circuitry further includes fetch circuitry for transferring a word from said buffer to said interconnection network.

5. The processing system of claim 4 wherein said fetch circuitry includes means to transfer successive words from said multiple word buffer.

6. A digital processing system comprising:
a digital processor;
a memory organized in rows and columns and including memory support circuitry and a plurality of memory modules in the form of a plurality of dynamic random access memory modules which are accessed in page mode to obtain a line of data;
an interconnection network including a memory controller coupled between said processor and said memory for sequencing the memory operations, said memory controller generating a first control signal indicating a selected word of a line of data; and
said memory support circuitry including means responsive to said first control signal for concurrently generating a unique column address for each of said plurality of memory modules and for providing said unique column addresses to each of said plurality of memory modules, said unique column addresses being a function of said first control signal and specifying the starting word and successive column addresses associated with successive words of the line of data in memory; and
wherein said memory support circuitry further includes means responsive to said first control signal for steering a Column Address Strobe (CAS) signal to said dynamic random access modules associated with said line of data.

7. The digital processing system as claimed in claim 6 wherein the plurality of memory modules provide a memory bank, and wherein said memory controller multiplexes said first control signal with a bank select signal provided to select a subset of said plurality of memory modules with the bank select signal.

8. A digital processing system comprising:
a digital processor;

a memory organized in rows and columns and including memory support circuitry and a plurality of memory modules;

an interconnection network including a memory controller coupled between said processor and said memory for sequencing the memory operations, said memory controller generating a first control signal indicating a selected word of a line of data; and said memory support circuitry including means responsive to said first control signal for concurrently generating a unique column address for each of said plurality of memory modules and for providing said unique column addresses to each of said plurality of memory modules, said unique column addresses being a function of said first control signal and specifying the starting word and successive column addresses associated with successive words of the line of data in memory; and wherein said memory controller includes means for providing a Column Address Strobe (CAS) signal, said memory support circuitry further including means for changing said unique column addresses provided to each of said plurality of memory modules in response to a transition of said CAS signal and wherein said memory support circuitry further includes means responsive to said first control signal for steering a Column Address Strobe (CAS) signal to said plurality of memory modules associated with said line of data.

9. A digital processing system comprising:

a digital processor;

a memory organized in rows and columns and including memory support circuitry and a plurality of memory modules in the form of a plurality of dynamic random access memory modules which are accessed in page mode to obtain a line of data;

an interconnection network including a memory controller coupled between said processor and said memory for sequencing the memory operations, said memory controller generating a first control signal indicating a selected word of a line of data; and said memory support circuitry including means responsive to said first control signal for concurrently generating a unique column address for each of said plurality of memory modules and for providing said unique column addresses to each of said plurality of memory modules, said unique column addresses being a function of said first control signal and specifying the starting word and successive column addresses associated with successive words of the line of data in memory; and wherein said memory support circuitry further includes means responsive to said control signal for steering a Column Address Strobe (CAS) signal to said dynamic random access memory modules associated with said line of data, and wherein said memory controller further incorporates programmable means to control the access time of the memory.

10. A digital processing system comprising a digital processor;

a memory organized in rows and columns and including memory support circuitry and a plurality of memory modules in the form of a plurality of dynamic random access memory modules which are accessed in page mode to obtain a line of data;

an interconnection network including a memory controller coupled between said processor and said memory for sequencing the memory operations, said memory controller generating a first control signal indicating a selected word of a line of data; and said memory support circuitry including means responsive to said first control signal for concurrently generating a unique column address for each of said plurality of memory modules and for providing said unique column addresses to each of said plurality of memory modules, said unique column addresses being a function of said first control signal and specifying the starting word and successive column addresses associated with successive words of the line of data in memory; and wherein said memory support circuitry further includes means responsive to said first control signal for steering a Column Address Strobe (CAS) signal to said dynamic random access modules associated with said line of data; and wherein said memory controller further includes programmable circuitry for controlling generation of row and column timing signals for said dynamic random access memory modules, and for controlling generation of row and column addresses in support of page and non-page mode addressing of said dynamic random access memory modules.

11. A digital processing system comprising a plurality of digital processor;

a plurality of memories organized into rows and columns including memory support circuitry and a plurality of memory modules;

an interconnection network including a memory controller coupled between said processor and said memory for sequencing the memory operations, said memory controller generating first control signals indicating a selected word of a line of data; and said memory support circuitry including means responsive to said first control signal for concurrently generating a unique column address for each of said plurality of memory modules and for providing said unique column addresses to each of said plurality of memory modules, said unique column addresses being a function of said first control signal and specifying the starting word and successive column addresses associated with successive words of the line of data in memory; and wherein said plurality of memories include a plurality of dynamic random access memory modules which are accessed in page mode by said memory support circuitry to obtain a line of data indicated by said first control signal; and wherein said memory controller includes means for providing a CAS signal and said memory support circuitry further includes means for changing the column address to the dynamic memory modules in response to an active to inactive transition of said CAS signal.

12. The processing system of claim 11 wherein said memory support circuitry further includes means responsive to said first control signals for steering a Column Address Strobe (CAS) signal to said dynamic random access modules associated with said line of data.

13. The digital processing system as claimed in claim 11 wherein said memory controller further includes programmable means to control access time of said memories.

14. The digital processing system as claimed in claim 11 wherein the plurality of memory modules provide a memory bank, and wherein said memory controller multiplexes said first control signal with a bank select signal provided to select a subset of said plurality of memory modules with the bank select signal.

* * * * *